Aug. 13, 1940.  L. S. KASSEL  2,211,211
METHOD FOR REACTIVATING CATALYSTS
Filed Oct. 12, 1939
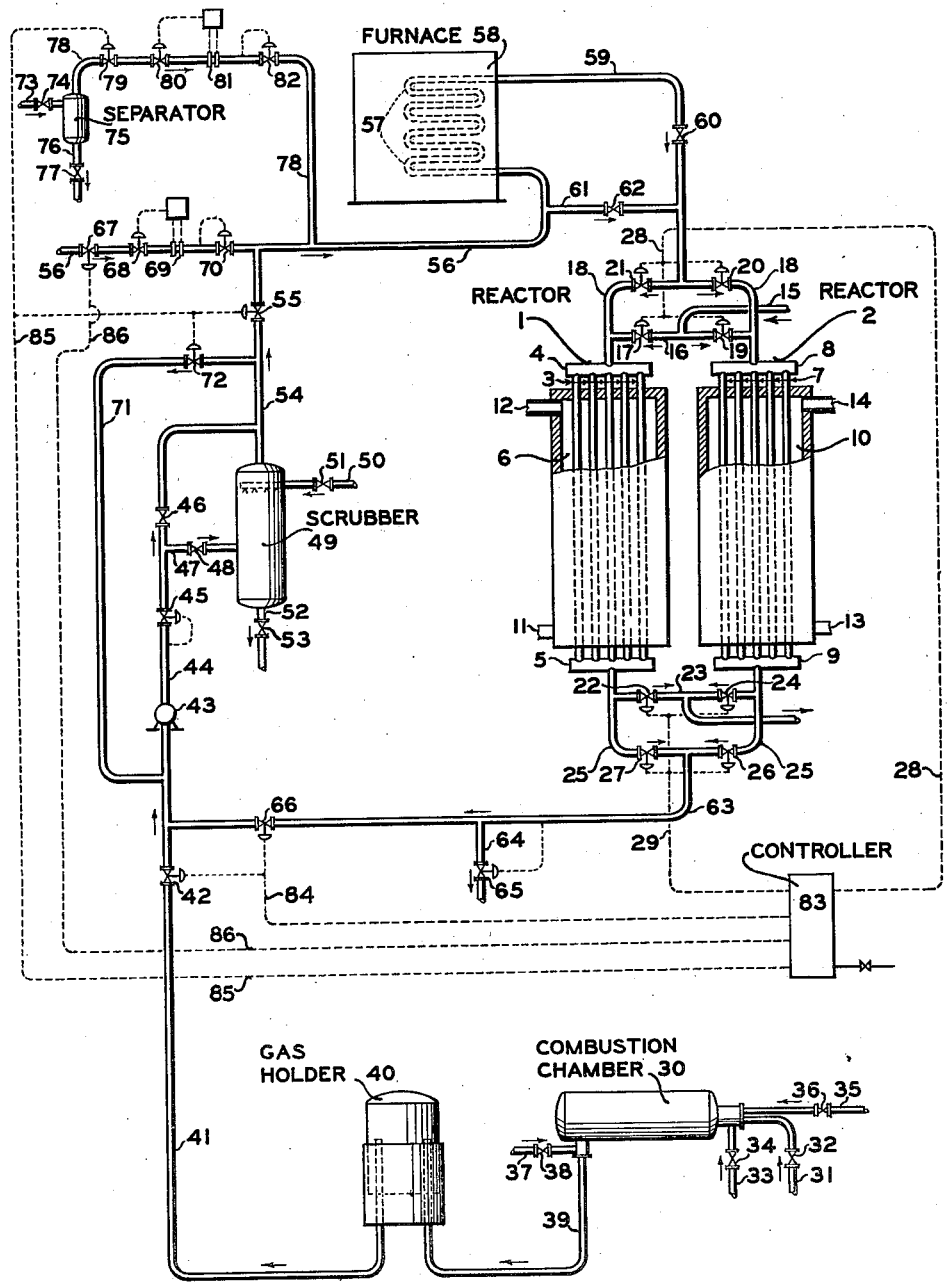
INVENTOR
LOUIS S. KASSEL
BY *Lee Cary*
ATTORNEY Patented Aug. 13, 1940

2,211,211

UNITED STATES PATENT OFFICE 2,211,211

METHOD FOR REACTIVATING CATALYSTS

Louis S. Kassel, Chicago, Ill., assignor to Universal Oil Products Company, Chicago, Ill., a corporation of Delaware Application October 12, 1939, Serial No. 299,103

5 Claims. (Cl. 23—238)

This invention relates particularly to an improved method of reactivating catalysts and particularly those of the type commonly employed in the dehydrogenation and dehydrocyclization of paraffins and/or in catalytic cracking processes, wherein reactivation of the catalysts involves burning therefrom deleterious materials, such as carbon or carbonaceous substances generally, deposited on the catalyst particles during their contact with the hydrocarbons undergoing conversion.

In the catalytic reactions and particularly catalytic endothermic reactions, such as, for example, catalytic dehydrogenation, dehydrocyclization, and catalytic cracking employing catalysts of the type exemplified by alumina-chromia for dehydrogenation and dehydrocyclization and silica-alumina for catalytic cracking, the catalyst becomes fouled with carbon or a generally carbonaceous deposit, probably due either to the complete dehydrogenation of some molecules of the gases or liquids or to the formation of molecules having a relatively low hydrogen content. The carbonaceous deposit formed in the manner described, or in a similar manner, deposits on the active surface of the catalyst and, by decreasing its exposed surface, decreases its activity. The amount of such carbonaceous material deposited upon the catalyst therefore determines how long the reactants may be subjected to contact with the catalyst before reactivation is necessary. From an economic standpoint, it has been found desirable to reactivate the catalyst at predetermined, sufficiently frequent intervals that the reduced activity of the catalyst, before reactivation, does not materially reduce the yield or quality of the desired products.

When such frequent reactivation of the catalyst is practiced, I prefer to employ an apparatus having two or more reactors each comprising a plurality of tubular elements connected in parallel and containing catalytic material capable of promoting the desired reaction, with provision for alternate processing of the charging stock and reactivation of the catalysts in each reactor. In an apparatus of this type, the catalyst may be subjected to reactivation for the same length of time to which it is subjected to contact with the reactants undergoing treatment, the controlling factor being the amount of carbonaceous material deposited in a given time and the relative ease in removing these carbonaceous deposits. However, it has been found that the length of the operating cycle may, in many cases, be varied from ten minutes to one hour and ten minutes with ease.

Although the method which involves passing reactivating gases of suitable low oxygen content over the catalysts, venting one portion of the effluent gases to the atmosphere, adding air to the other portion to restore the original volume, and recirculating the mixture over the catalysts, is highly satisfactory when the catalyst in only a single reactor tube or chamber is being reactivated, I have found that the same general method applied to simultaneous regeneration in a number of parallel reactor tubes is quite unsatisfactory. I attribute this to the fact that although the zone of burning in each tube moves forward at approximately the same rate, there are naturally small differences in the rates of oxidation, due to temperature variations between the different reactor tubes, variations in the amount of carbonaceous materials deposited in the several reactor tubes, flow differences, and the like, so that burning is not simultaneously completed in all reactor tubes. When effluent reactivating gases are recirculated to all of the reactor tubes until reactivation is completed in all of them, as burning is completed in some and not in others, and with air continuously added to the gases being recycled, their oxygen content will materially increase as burning is completed in some of the tubes but not in others. Since the oxygen content of the reactivating gases is rather critical, when substantially all of the carbonaceous materials in one or more reactor tubes has been burned away, the oxygen concentration and subsequent rate of oxidation and temperature rise is excessively high in other reactor tubes wherein carbonaceous deposits still exist. This is deleterious to the catalyst, because the high temperatures obtained tend to break down its physical structure and thus permanently impair or destroy its activity in those zones of the catalyst beds wherein the excessive temperatures are encountered. When the same procedure is repeated in successive frequent reactivation periods, the deleterious results are, of course, cumulative and the activity of all or a substantial portion of the entire catalyst mass may be destroyed in a much shorter time than when proper precautions, such as herein provided, are taken.

My invention obviates the disadvantages above mentioned while retaining the same general method of reactivation and its attended advantages by an improved operating procedure which prevents an excessive increase in the oxygen concentration of the reactivating gases during the critical portion of the burning period, (i. e., that period of the reactivation during which primary burning is completed in some but not all of the reactor tubes).

In general, the invention provides for preventing excessively high rates of oxidation during the reactivation of the catalyst materials in the manner above outlined, and particularly during the aforementioned critical burning period by preventing the accumulation of oxygen in the reactivating gases during this period. This may be accomplished within the scope of the invention in a number of specific ways which are not to be considered fully equivalent and may be selected to suit requirements. The specific manners of accomplishing the object of the invention include, decreasing the quantity of air added during the critical burning period and thereby maintaining the oxygen content of the reactivating gases which contact the catalyst substantially uniform as the oxygen content of the recirculated portion of these gases increases, or by injecting regulated quantities of inert gas such as steam or oxygen-free combustion gases, into the stream of reactivating gases being recycled, or by stopping recirculation entirely from the start of the critical burning period until the primary burning reaction has gone to completion in all reactors, and, instead of recycling the reactivating gases during this period, supplying to the reactor from an external source a stream of relatively inert gas containing a controlled proportion of air or oxygen and continuously removing the effluent gases from the system.

In an apparatus of the type which employs a plurality of reactor tubes in each reactor zone, I can, for example, measure the temperature of the effluent gases in a representative number of reactor tubes and thereby determine with sufficient precision the time when the primary burning zone has traversed the entire length of the first few reactors; i. e., I can determine with sufficient accuracy when the temperature at the bottom of the reactor tubes begins to drop off from the maximum attained temperature, or I can use analytical methods to determine the oxygen content of the effluent gas, or, on the other hand, I can determine from past experience with a given apparatus the time at which the critical burning is reached in each reactivation and carry out the entire operation on a predetermined fixed time schedule. Regardless of how the determination is made, at the start of the critical burning period, I may, either by manual or automatic control, stop the recirculation of effluent gases and, during the critical burning period, employ a relatively inert gas, such as steam or freshly generated combustion gases, with a controlled oxygen content. When primary burning is completed in all of the reactor tubes, as shown by a decrease in temperature in those reactor tubes where primary burning was not previously completed, I can again resort to the recirculation of effluent gases and allow the oxygen concentration to build up as a result of this recirculation in order to accelerate secondary burning within the pores of the catalyst particles.

One specific embodiment of the invention comprises passing a stream of hot, relatively inert gases (substantially free of oxygen) through a plurality of reactor tubes disposed within a single reactor containing a mass of catalyst upon which carbonaceous materials have been deposited, continuing the flow of said inert gases through the reactor for a time sufficient to substantially purge said reactor tubes of any hydrocarbon gases retained therein, thereafter commingling controlled minor amounts of oxygen with said inert gases and passing the commingled reactivating gases through the reactor tubes whereby to burn away said carbonaceous materials from the catalyst while controlling the oxidation reaction so as not to exceed a predetermined temperature in the catalyst mass, exhausting a portion of the effluent gases, equivalent to the volume of oxygen commingled with the reactivating gases, and recirculating the balance of the effluent gases through the reactor tubes until substantially all of the carbonaceous material has been burned from the surface of the catalyst particles in some but not all of the reactor tubes, determining this point in the reactivating cycle by measuring the temperatures of the effluent gases discharged from a representative number of reactor tubes, then stopping said recirculation of effluent gases and passing through the reactor tubes a stream of hot relatively inert gases admixed with controlled amounts of oxygen until substantially all the carbonaceous material has been burned from the surface of the catalyst particles in all of the reactor tubes as determined by a drop in temperature of the exit gases from those reactor tubes wherein a temperature drop has not previously occurred, then reestablishing the recirculation of effluent gases through the reactor tubes and adding oxygen thereto at a substantially uniform rate until substantially all the remaining carbonaceous material deposited in the pores of the catalyst particles has been burned therefrom, as determined by another drop in the temperature of the exit gases from each of the reactor tubes, and finally substantially purging the reactor tubes of retained oxygen-containing gases by discontinuing the recirculation of said effluent gases and the supply of oxygen to the reactor tubes and passing therethrough a stream of relatively inert gases free of oxygen.

The term "primary burning," as used herein, refers to the combustion that takes place on the surface of the catalyst particles. This burning is usually quite vigorous, due to the presence of relatively large quantities of carbon, and since the reaction is exothermic the amount of oxygen present in the reactivating gases must be limited to prevent overheating which would result in damage to the catalyst. The term "critical burning period" has reference to the time required to complete the primary burning reaction in some reactor tubes after primary burning has been completed in other reactor tubes. The term "secondary burning" refers to oxidation of the carbonaceous materials deposited in the pores of the catalyst particles, and since, due to the relatively small amount of carbonaceous material involved, this burning reaction is not as vigorous as that which takes place during the primary burning reaction, higher oxygen concentration may be employed without danger of overheating in the catalyst.

One means for accomplishing the object of the present invention is illustrated in the accompanying diagrammatic drawing. The apparatus illustrated is particularly applicable in processes such as dehydrogenation, dehydrocyclization, catalytic cracking, etc., and the description that follows is directed toward the use of this invention in any of the above processes. However, it is to be understood that the invention is not limited to use in reactivating catalysts employed in the specific reactions mentioned but may be employed to advantage in reactivating any catalyst which has become fouled or reduced in activity by the deposition of oxidizable materials thereon and which are susceptible to damage at high temperatures within the range of those obtainable by oxidation of said deposited materials.

Referring to the drawing, the apparatus in which the catalytic reactions are carried out is shown as consisting of two reactors 1 and 2. Reactor 1 consists of reactor tubes 3 connected in parallel between upper and lower manifolds 4 and 5, respectively, and is disposed within an enclosed zone 6 which serves as a heating zone while the reaction taking place in tubes 3 is endothermic and serves as a cooling zone while reactivation of the catalyst disposed in tubes 3 (an exothermic reaction) is taking place. Reactor 2 consists of reactor tubes 7 connected in parallel between upper and lower manifolds 8 and 9 and is disposed within a fluid heating and cooling zone 10. The apparatus is shown as consisting of only two reactors each containing 5 parallel reactor tubes but the invention is not limited in this respect since its features may be employed to advantage in any apparatus having one or more reactors and in which each reactor comprises any desired number of a plurality of tubular elements connected in series or parallel and containing catalytic material of the type above mentioned. Conduits 11 and 12, communicating with zone 6, and conduits 13 and 14, communicating with zone 10, serve as means of admitting cooling fluid to the respective zones and removing the same therefrom while reactivation is taking place in the reactor and for admitting heating fluid to the respective zones and removing the same therefrom while endothermic processing of the reactants is taking place in the reactors.

Tubes 3 and 7 of the respective reactors 1 and 2 each contain a bed of catalytic material capable of promoting the desired reaction. For example, in dehydrogenation or dehydrocyclization the preferred catalyst may consist of aluminum oxide supporting about 20% or less of chromium sesquioxide, but other composite calaysts of a refractory character, may be employed. Other suitable catalysts for dehydrogenation and dehydrocyclization are, for example, alumina or silica or an inert refractory material composited with compounds (preferably oxides) of selected elements in the left hand columns of groups 4, 5, and 6 in the periodic table. Catalysts of a refractory character, such as, for example, silica composited with compounds of the group consisting of zirconia, vanadia, alumina-zirconia, and alumina-thoria may be employed as a cracking catalyst.

Provision is made for alternately switching the flow of reactivating gases and process vapors or gases from one reactor to the other in order that processing of the hydrocarbon vapors or gases and reactivation of the catalyst may be continuously and simultaneously accomplished. This may be accomplished in a number of ways, but I prefer to employ a suitable valve switching arrangement which may be operated either manually or by automatic control equipment. For example, when the activity of the catalyst in reactor 1 is substantially decreased, due to the deposition of carbonaceous materials, the process vapors introduced to the system through line 15 and directed to reactor 1 by way of line 16, valve 17, and line 18 are switched to reactor 2 by closing valve 17 and opening valve 19 in the same line. At the same time the flow of reactivating gases to reactor 2 through line 18 and valve 20 is diverted to reactor 1 via valve 21 by closing valve 20 and opening valve 21 in line 18. Substantially simultaneously or shortly thereafter, valve 22 in line 23, through which the products of reaction from reactor 1 are directed to suitable recovery equipment, not shown, is closed and valve 24 in the same line is opened in order that the products of reaction from the reactor 2 may now be directed to the recovery equipment, while valve 26 in line 25, through which the reactivating gases and products of combustion are withdrawn from reactor 2, is closed and valve 27 in the same line opened in order that the reactivating gases now being introduced to reactor 1, together with the products of combustion generated therein, may be withdrawn therefrom. When desired, valves 17, 19, 20, 21, 22, 24, 26, and 27 may be automatic control valves, in which case valves 17, 20, 22, and 26 are preferably reverse acting, and valves 19, 21, 24, and 27 are direct acting, or vice versa; line 28 leading from the control instrument 83 being connected to the actuating mechanism of valves 17, 19, 20, and 21 and line 29 from the same control instrument being connected to the actuating mechanism of valves 22, 24, 26, and 27 so that a single impulse transmitted from the controller through line 28 will open the reverse acting valves connected therewith and simultaneously close the direct acting valves of this group and a single impulse transmitted from the controller through line 29 will open the reverse acting valves connected thereto and close the direct acting valves of this group.

In the following description, we will consider that hydrocarbon vapors are being catalytically cracked in reactor 2, to which a stream of said vapors has been switched from reactor 1 and that reactor 1 is ready to be purged of hydrocarbon vapors, following which the catalyst therein may be reactivated.

Combustion gases, substantially devoid of air, are generated in combustion chamber 30. Fuel for combustion is admitted through line 31 containing valve 32 and air necessary for combustion is admitted through line 33 containing valve 34. Water or steam may be introduced through line 35 containing valve 36 in sufficient quantities to materially reduce the temperature in the combustion chamber and prevent overheating of the refractory lining. The combustion gases leaving combustion zone 30 would normally be at a relatively high temperature and, in order to prevent exposing the outlet conduit 39 to excessively high temperatures and to cool the combustion gases, steam or water is preferably introduced through line 37 containing valve 38. The combustion gases generated in combustion zone 30, together with the vaporized water or steam added, are directed through line 39 to gas holder 40.

The actual reactivating period is preceded by a purge period during which substantially oxygen-free inert gases, generated as previously described, are supplied to reactor 1 to displace hydrocarbon vapors which remain therein at the time the stream is switched to reactor 1. These inert gases are withdrawn from gas holder 40 through line 41 and are directed through valve 42 to compressor 43. Valve 66 in line 63 is closed and valve 42 is open, the operating mechanism of each of these valves being connected through line 84 with controller 83 and actuated thereby to simultaneously open one and close the other. Compressor 43 discharges through line 44 and back pressure control valve 45 and the gases may be directed through valve 46 into line 54. Preferably, however, valve 46 is closed and the gases are directed from line 44 through line 47 and valve 48 into scrubber 49 wherein they are contacted with water for the removal of impurities deleterious to the catalyst. Water is introduced to scrubber 49 through line 50 containing valve 51 and is withdrawn, together with the impurities which it removes from the combustion gases, from the lower portion thereof through line 52 and valve 53 to waste.

The scrubbed gases are directed from the upper portion of scrubber 49 through line 54 and valve 55 into line 56. In the case here illustrated, the operating mechanism of each of the valves 55, 72, and 79 is connected to controller 83 by line 85 and actuated by an impulse from the controller so that when valve 55 is open valves 72 and 79 are simultaneously closed, and vice versa. At this particular period of the operation, valve 55 is open and valves 72 and 79 are closed.

The relatively inert combustion gases thus supplied to line 56 are directed to heating coil 57 wherein they are raised to a predetermined temperature by means of heat supplied from furnace 58. The heated gases from heating coil 57 are directed through line 59, valve 60, line 18 and valve 21 into reactor 1, valves 21 and 19 being open and valves 17 and 20 closed. When desired, all or a portion of the relatively inert gases used in the purging operation may be directed from line 56 through line 61 and valve 62 into line 59 in order to reduce the temperature of the gases employed as the purging medium. In passing through reactor 1 the relatively inert combustion gases displace therefrom the hydrocarbon vapors remaining after the flow of reactants has been switched to reactor 2. After passing through reactor 1 the purging gases are directed from the lower portion thereof through line 25, valve 27, line 63, line 64, and valve 65 to the atmosphere or elsewhere as desired, valves 24 and 27 being open and valves 22 and 26 being closed. As here shown, valve 65 may be a back pressure control valve which automatically opens to hold a predetermined pressure in line 63 as pressure builds up in this line, due to the accumulation therein of exit purging gases, while valve 66 remains closed, so that the rate of flow of gases through the reactor is kept substantially constant.

When the predetermined time required for purging reactor 1 has elapsed, controller 83 operates to close valve 42 and open valve 66, and a portion of the effluent gases discharged from reactor 41 is directed to the suction of compressor 43. At substantially the same time controller 83 operates to open valve 67 in air line 56 by an impulse transmitted through line 86 permitting air to pass in the desired amount through flow control valve 68, orifice 69, and back pressure control valve 70 into the stream of combustion gases passing through line 56, so as to obtain the desired oxygen content in the reactivating gases now introduced to reactor 1. The oxygen-containing reactivating gases flow from line 56 through heating coil 57, line 59, valve 60, line 18 and valve 21 into reactor 1. The effluent gases from reactor 1 are directed from the lower portion thereof through line 25, valve 27 and line 63, and a portion equivalent to the volume increase in this stream caused by the introduction of air is automatically discharged from the system through line 64 by the operation of back-pressure valve 65. The remaining effluent gases from reactor 1 are directed through valve 66 in line 63 and through line 41 to the suction of compressor 43 and recirculated to the reactor after air has been commingled therewith in the manner previously described.

In the case here illustrated, when the primary burning reaction has been completed in one or more but not all of the reactor tubes 3, controller 83 operates to close valve 55 and open valves 72 and 79 in order that steam containing regulated quantities of oxygen may be introduced to the reactor during the critical burning period. With valve 55 closed and valve 72 opened, the gases in line 54 normally employed as the oxygen-carrying medium are directed back to the suction of compressor 43 by way of line 71, valve 72, and line 41 so that it is unnecessary to stop compressor 43 for the relatively short period required to complete primary burning in all the tubes 3. With the combustion gases locally recycled, as described, the steam introduced to line 56 from line 78 is commingled therein with the air injected, as previously described, and the mixture of steam and air is employed as the reactivating gases during the critical burning period. During the time steam is introduced as the reactivating gas mixture, i. e., during the critical burning period, the effluent gases in line 63, in excess of the amount required to maintain the desired pressure on the reactivating system, are exhausted to the atmosphere through line 64 and valve 65, as previously described.

In the case here illustrated, steam is first introduced into a separator 75 by way of line 73 and valve 74 wherein any condensate contained in the steam is dropped out and removed through line 76 and valve 77. Relatively dry steam is directed from the upper portion of separator 75 through line 78, valve 79, flow control valve 80, orifice 81, and back pressure control valve 82 into line 56. Orifice 81 is connected to a suitable flow controller which regulates the volume of steam introduced to the system by means of flow control valve 80.

When the primary burning of the carbonaceous materials has gone to completion in all of the reactors and the carbonaceous materials deposited upon the interior of the catalyst particles is all that remains to be burned, recirculation of effluent gases may again be resumed by closing valve 72 and 79 and opening valve 55. At this time, the oxygen injection may be increased in order to speed up the rate of burning during the secondary burning period, care being taken, however, that the oxygen concentration in the reactivating gas mixture does not reach an amount which will cause too rapid burning and result in excessively high temperature in the reactor tubes and damage to the catalyst.

During the critical burning period, instead of employing steam as the inert carrier for oxygen, I may, for example, stop the recirculation entirely by closing valve 66 and opening valve 42, in which case compressor 43 would take suction on the substantially oxygen-free combustion gases in holder 40 and these gases, after the injection of regulated quantities of oxygen in line 56, may be introduced to reactor 1 as the reactivating gases, as previously described, the spent or partially spent reactivating gases being discharged from the system through line 64 and valve 65, so that no oxygen-containing gases are recycled and the concentration of oxygen in the reactivating gases remains constant.

When the reactivation of the catalyst in reactor 1 is completed, at a predetermined time prior to the switching of the reactants from reactor 2 to reactor 1, the recirculation of effluent gases is stopped by closing valve 66. Simultaneous with the closing of valve 66, valve 42 is opened and valve 67 is closed, thereby shutting off the oxygen injection and causing the introduction of substantially oxygen-free gases withdrawn from gas holder 40 to reactor 1 whereby to purge the same of oxygen-containing gases remaining after the burning reaction.

After reactor 1 is purged of oxygen-containing gases, the flow of reactants is switched from reactor 2 to reactor 1 and the flow of purging gases substantially free of oxygen is switched from reactor 1 to reactor 2. After reactor 2 is purged of hydrocarbon gases, oxygen is again admitted through line 56, valves 66 and 67 being opened and valve 42 closed, and the same procedure employed for reactivating the catalysts in reactor 1 is now employed in reactor 2.

Following is an example of the operation of the process as applied to the catalytic dehydrogenation of butane, but it is not intended to limit the invention to use with this specific type of catalytic conversion. When employing a catalyst comprising aluminum oxide supporting aluminum sesquioxide the catalyst is alternately processed for about one hour and reactivated for one hour. The apparatus employed for carrying out a reaction of this type, in its more common form, comprises a furnace consisting of two fluid heating zones in which the reactor, comprising a plurality of reactor tubes, is disposed. The apparatus also includes a valved header arrangement that permits switching the flow of process gas and reactivating gases alternately from one reactor to the other, and a means for cooling the reactor containing the catalyst undergoing reactivation, and for supplying fluid heat to the reactor through which the process gas is flowing.

My invention, employed in combination with the apparatus of the type mentioned above, makes the operation entirely automatic. For example, when the process gas has passed through one reactor for one hour the flow of process gas is switched to the other reactor and at the same time the flow of hot combustion gases used in the reactivation of the catalyst is switched to the first mentioned reactor. Prior to and subsequent to the switching of the reactivating gases from the second reactor to the first mentioned reactor, the oxygen injection into said reactivating gases is stopped and substantially oxygen-free combustion gases introduced from an external source are permitted to pass through the reactor which is about to undergo reactivation for a short period of time, such as, for example, three minutes in order to purge the same of any hydrocarbon gases remaining therein. After the predetermined time necessary for purging has elapsed, valve 42 in line 41, leading from gas holder 40, is closed, and valve 66 in line 63 is opened thereby permitting recirculation of the effluent gases discharged from the reactor undergoing reactivation. Substantially simultaneously valve 67 in line 56 is opened permitting air to pass in regulated quantities into the reactivating gas stream in line 56, and it is usually desirable to maintain an oxygen concentration of approximately 2% with the temperature of this stream at about 1000° F. For best results, the oxygen concentration of the reactivating gas stream is maintained low enough so that the temperatures reached when burning the surface deposits from the catalyst particles do not exceed 1400° F. and preferably not over 1200° F.

When the surface combustion is completed in one or more, but not all, of the reactors, generally requiring approximately 20 minutes, the stream of effluent gases previously recirculated as the reactivating gas stream is diverted by opening valve 72 and closing valve 55. Substantially simultaneously valve 79 is opened and steam is introduced to the reactor as the reactivating gas with the air injection remaining the same.

When the critical burning period is passed, i. e., when the primary burning reaction has gone to completion in all of the reactor tubes, valves 72 and 79 are closed and valve 55 is opened, and the effluent gases from the reactor undergoing conversion are again recirculated as the reactivating gas for the duration of the reactivation period.

Approximately 3 minutes before the flow of reactivating and process gases is switched from one reactor to the other, the recirculation of effluent gases is stopped by closing valve 66. Simultaneously, valve 42 is opened and substantially oxygen-free combustion gases from gas holder 40 are introduced to the reactor for purging it of any oxygen-containing gases remaining therein.

I claim as my invention:

1. In the reactivation of a mass of porous catalyst granules, the activity of which has been substantially reduced by the deposition of carbonaceous material in the pores and on the surface of said granules, wherein a stream of hot, relatively inert gases, with which regulated amounts of oxygen from an external source are admixed, is divided into a plurality of separate streams, each of said separate streams passed in contact with a separate bed of said catalyst granules, whereby to burn said carbonaceous material therefrom and wherein effluent gases from each of said beds are returned to the first named stream, whereby to establish a cycle of reactivating gases, the improvement which comprises preventing any substantial increase in the concentration of oxygen in any of said separate streams entering the catalyst beds during that period of the reactivation in which the burning of said carbonaceous material from the surface of the catalyst granules is substantially completed in some, but not all, of said beds, without intentionally changing the amount of oxygen supplied to the system from an external source, by bleeding all of said effluent gases from the cycle during the last named period and substituting therefor a stream of relatively inert gases from an external source.

2. In the reactivation of a mass of porous catalyst granules, the activity of which has been substantially reduced by the deposition of carbonaceous material in the pores and on the surface of said granules, wherein a stream of hot, relatively inert gases, with which regulated amounts of oxygen from an external source are admixed, is divided into a plurality of separate streams, each of said separate streams passed in contact with a separate bed of said catalyst granules, whereby to burn said carbonaceous material therefrom and wherein effluent gases from each of said beds are returned to the first named stream, whereby to establish a cycle of reactivating gases, the improvement which comprises preventing any substantial increase in the concentration of oxygen in any of said separate streams entering the catalyst beds during that period of the reactivation in which the burning of said carbonaceous material from the surface of the catalyst granules is substantially completed in some, but not all, of said beds, without intentionally changing the amount of oxygen supplied to the system from an external source, by bleeding all of said effluent gases from the cycle during the last named period and substituting therefor a stream of substantially oxygen-free combustion gases from an external source.

3. In the reactivation of a mass of porous catalyst granules, the activity of which has been substantially reduced by the deposition of carbonaceous material in the pores and on the surface of said granules, wherein a stream of hot, relatively inert gases, with which regulated amounts of oxygen from an external source are admixed, is divided into a plurality of separate streams, each of said separate streams passed in contact with a separate bed of said catalyst granules, whereby to burn said carbonaceous material therefrom, and wherein effluent gases from each of said beds are returned to the first named stream, whereby to establish a cycle of reactivating gases, the improvement which comprises preventing any substantial increase in the concentration of oxygen in any of said separate streams entering the catalyst beds during that period of the reactivation in which the burning of said carbonaceous material from the surface of the catalyst granules is substantially completed in some, but not all, of said beds, without intentionally changing the amount of oxygen supplied to the system from an external source, by bleeding all of said effluent gases from the cycle during the last named period and substituting steam therefor.

4. In the reactivation of a mass of porous catalyst granules composed essentially of alumina composited with compounds selected from the group consisting of compounds of the elements in the left hand columns of groups 4, 5, and 6 in the periodic table, the activity of which has been substantially reduced by the deposition of carbonaceous material in the pores and on the surface of said granules, wherein a stream of hot, relatively inert gases, with which regulated amounts of oxygen from an external source are admixed, is divided into a plurality of separate streams, each of said separate streams passed in contact with a separate bed of said catalyst granules, whereby to burn said carbonaceous material therefrom and wherein effluent gases from each of said beds are returned to the first named stream, whereby to establish a cycle of reactivating gases, the improvement which comprises preventing any substantial increase in the concentration of oxygen in any of said separate streams entering the catalyst beds during that period of the reactivation in which the burning of said carbonaceous material from the surface of the catalyst granules is substantially completed in some, but not all, of said beds, without intentionally changing the amount of oxygen supplied to the system from an external source, by bleeding all of said effluent gases from the cycle during the last named period and substituting therefor steam.

5. In the reactivation of a catalyst mass comprising porous granules composed of silica composited with a compound selected from the group consisting of alumina, zirconia, vanadia, alumina-zirconia, and alumina-thoria, the activity of which has been substantially reduced by the deposition of carbonaceous material in the pores and on the surface of said granules, wherein a stream of hot, relatively inert gases, with which regulated amounts of oxygen from an external source are admixed, is divided into a plurality of separate streams, each of said separate streams passed in contact with a separate bed of said catalyst granules, whereby to burn said carbonaceous material therefrom, and wherein effluent gases from each of said beds are returned to the first named stream, whereby to establish a cycle of reactivating gases, the improvement which comprises preventing any substantial increase in the concentration of oxygen in any of said separate streams entering the catalyst beds during that period of the reactivation in which the burning of said carbonaceous material from the surface of the catalyst granules is substantially completed in some, but not all, of said beds, without intentionally changing the amount of oxygen supplied to the system from an external source, by bleeding all of said effluent gases from the cycle during the last named period and substituting therefor steam.

LOUIS S. KASSEL.